Aug. 14, 1945.  H. E. HARGY, SR  2,382,479
BUFFING WHEEL HUB
Filed Nov. 29, 1943

INVENTOR.
Harry E. Hargy Sr.
BY
Murray, Sackhoff & Packhack
ATTYS

Patented Aug. 14, 1945

2,382,479

UNITED STATES PATENT OFFICE 2,382,479

BUFFING WHEEL HUB

Harry E. Hargy, Sr., Sycamore Township, Hamilton County, Ohio

Application November 29, 1943, Serial No. 512,200

7 Claims. (Cl. 51—193)

The present invention relates to buffing wheels and is particularly directed to an improved hub for mounting a buffing wheel to a rotating shaft.

Heretofore hubs for mounting buffing wheels of small diameters to the rotor shafts of electric motors developing small power outputs have been made of relatively heavy parts, such as cast iron or the like, which, in operation, resulted in undue wear of the motor shaft bearings. This bearing wear set up vibrations in the rotating buffing wheel hub and shaft which caused the set screw between them to frequently work loose and said set screw thereafter required constant tightening adjustments. Furthermore the frequent adjustments of this set screw between the inelastic metal parts of hub and shaft created a permanent off-center bulge in the shaft arbor holes formed in the hub which thereafter precluded the hub from concentrically positioning the wheel on said shaft.

It is therefore an object of the invention to provide a novel hub structure which overcomes the foregoing disadvantages and which is particularly adapted for mounting buffing wheels of small diameters to the rotor shafts of electric motors developing small power outputs.

Another object of the invention is to provide a buffing wheel hub having a reenforced clamping disc made of wood in which is threadedly secured a radially positioned set screw precluded from loosening by the elastic qualities of said disc and the manner in which said set screw is associated with the disc.

Another object of the invention is to provide an improved hub structure which is of light weight, does not produce undue wear on the motor shaft and positively clamps an associated buffing wheel to the rotating shaft therefor.

A further object of the invention is to provide a buffing wheel hub which materially dampens vibrations set up in said wheel when its peripheral working surface comes in contact with rough or uneven surfaces on the article operated upon.

Another object of the invention is to provide a hub structure which will permit its manufacture from a wide range of materials such as wood, and various plastics thereby greatly reducing its actual cost of construction.

Another object of the invention is to provide a mounting means which accurately positions and rigidly holds a buffing wheel in rotatory equilibrium regardless of the diameter of the arbor hole therein relative to the diameter of the rotating shaft upon which said wheel is to be mounted thereby providing a practical hub for converting to certain uses a great variety of discarded buffing wheels which have unused central portions.

Other objects will be apparent from the following specification and drawing which illustrates a preferred embodiment of my invention and in which.

Figure 1:
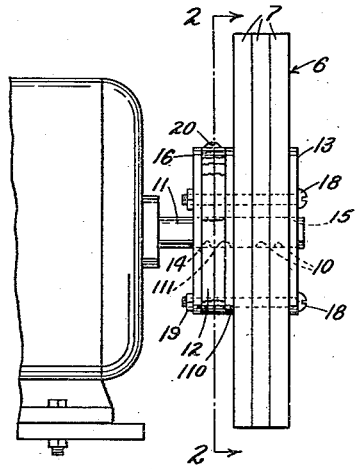
Fig. 1 is a fragmental, side elevation of a buffing wheel mounted on a rotating shaft in accordance with my invention.
Figure 2:
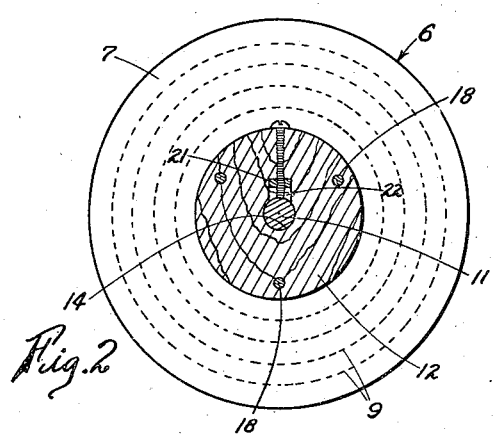
Fig. 2 is a cross-sectional view taken on line 2—2 of Fig. 1.
Figure 4:
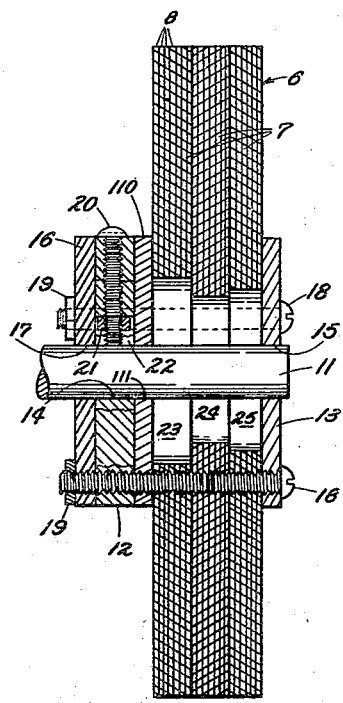
Fig. 4 is an enlarged, central cross-sectional view of the device of Fig. 1 showing the manner in which said device accommodates various sized arbor holes formed in buffing sections of the wheel.
Figure 3:
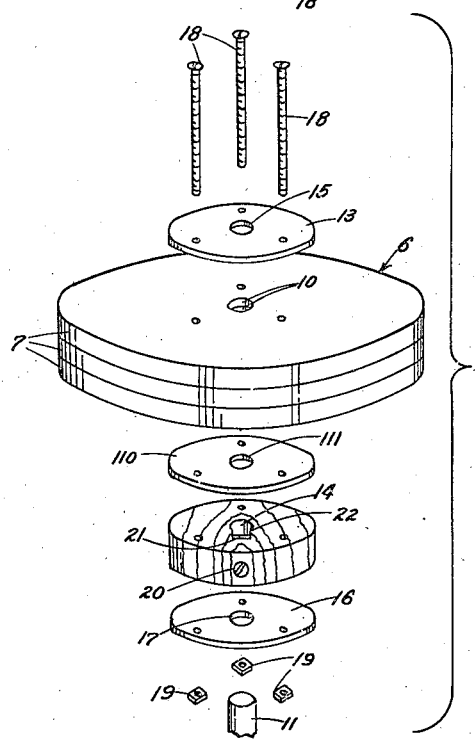
Fig. 3 is an exploded, perspective view of the device shown in Fig. 1.

The numeral 6 indicates a buffing wheel which is illustrated as comprising three sections 7. Each section is formed by a plurality of fabric laminations 8 (Fig. 4) bound together as by lines of stitches 9 and provided with centrally disposed arbor holes 10. These arbor holes are illustrated in Figs. 1–3 as having a diameter equal to the diameter of the motor shaft 11 upon which the wheel is coaxially positioned for rotatory operation on the work to be buffed, while Fig. 4 shows the manner in which my hub device is adapted to operatively mount a number of buffing sections having various sized arbor holes as will be more fully described hereinafter.

The device for rigidly mounting a number of sections 7 concentrically on the rotating shaft 11 to form a buffing wheel, consists of a resilient clamping disc 12, preferably made of wood, and an inflexible fastening disc 13, each having formed therethrough a centrally disposed hole 14 and 15 respectively, for snugly receiving the shaft 11. A reenforcing cap disc 110 may be positioned between the clamping disc and the wheel, and is provided with a concentrically disposed arbor hole 111 through which the shaft 11 passes. It will be understood that the inflexible cap disc 110 may be omitted without materially altering the functions of my buffing wheel and it is therefore employed merely to give added support to the resilient clamping disc 12. As illustrated in Figs. 1 and 4, the fastening disc and the cap disc are disposed on opposite sides of the buffing wheel, and are in contact with the circular portions of the exposed sides of the outermost sections 7 adjacent to the arbor holes therein.

An outer cap disc 16 has an inflexible body portion, abuts the clamping disc and is concentrically positioned on the shaft 11, said cap disc serving to reenforce the clamping disc adjacent its outer portion. As illustrated in Fig. 5, the arbor hole 17 formed in the cap disc 16 snugly receives the periphery of the shaft 11.

In assembled positions on the shaft, the shaft receiving holes in all of the discs and the arbor holes in the buffing wheel sections are in coaxial alignment, and are rigidly held together by a number of elongated draw bolts 18, preferably entered through the fastening disc 13 and pass through the buffing wheel sections, the clamping disc 12 and the cap discs 110 and 16. The draw bolts are disposed in parallelism with the shaft 11, and are spaced at equal radial distances therefrom, their extremities being threaded to nuts 19, engaging the exterior surface of the cap disc 16.

The effective clamping pressure necessary to rigidly hold the buffing wheel sections on the rotatory hub is exerted entirely by the draw bolts, and not by the discs. This structure permits my hub to be constructed from light materials having a relatively low structural strength. The reenforcing cap discs 16 and 110 and the fastening disc 13 may therefore be made of "Masonite" and other plastics, the reenforcing cap discs being adapted to strengthen the wooden clamping disc 12 disposed therebetween. The clamping pressure may also be greatly reduced for the reason that said bolts pass directly through, and are in close contact with the material of the buffing wheel sections, thus preventing tangential movement of said sections set up by centrifugal force when the wheel is in operation.

A hub set screw 20 is threaded in a radial direction through the wooden clamped disc 12, and threadedly engages a nut 21 positioned adjacent its inner end. It will be noted that the set screw is positioned in the longitudinal direction of the grain of the wood from which the cap disc is formed to thereby preclude splitting of the clamping disc when the set screw is tightened. The nut 21 is seated against rotation in a square groove 22 formed axially through the disc 12 at a portion adjacent to and in communication with the shaft hole 14 therewith. By drawing up on the screw, a resilient clamping action occurs between the nut 21, the outer surface of the groove 22, the wooden clamping disc 12 and the shaft 11. This resilient clamping action constantly urges the lower end of the screw against the shaft and precludes loosening of the screw during operative rotation of the buffing wheel.

In clamping position (Figs. 1 and 4) the head of the set screw 20 is drawn by bolt 21 against the exterior surface of the clamping disc 12, thereby compressing the material of the disc between the head and the nut. This compression serves to lock the screw in operative clamping position, and further prevents the loosening of the set screw in the hub.

Because of the reduced clamping pressure required to hold the buffing wheel sections in operative position and the characteristics of the materials of construction for the discs employed in my hub, the vibrations set up in the wheel during operation are materially dampened, thus conducing to a smoother and less harsh buffing action of the wheel. It will be noted that the hub of this invention involves a simplification of prior art devices, which results in a reduction of the cost of producing these devices due to saving of metal, and also produces an increased efficiency in carrying out its primary function.

It is a practice of the buffing wheel art for a manufacturer to use only the outer peripheral surface of a large wheel of 14 inches in diameter until it has been reduced to a diameter of about 6 inches, at which time it is discarded as inefficient to perform its particular operation. These discarded wheels and wheel sections are useful for a number of other operations and as they generally are provided with arbor holes of various sizes and of sizes greater than the motor shaft used for the second operation, it becomes necessary to provide a means of mounting said sections upon a single shaft. As illustrated in Fig. 4, my device is particularly adapted to mount discarded buffing wheel sections 7 having various sized arbor holes 23, 24, and 25 therein on a shaft 11 of a smaller diameter than the arbor holes in said sections. The method of building up the wheel from these sections consists in superimposing the sections one upon the other so that all the various sized arbor holes are in coaxial relationship. The fastening disc 13 is then aligned with the arbor holes by disposing the shaft hole therefor in coaxial alignment with the common axis of said arbor holes. Holes are then punched through said sections by using the disc as a die to locate their positions. The draw bolts are then inserted through the fastening disc and the sections, then through the clamping disc and cap disc and the nuts 19 are then threaded to the ends of the bolts and the entire structure is made rigid by drawing up on said bolts.

It will therefore be understood that my device is capable of mounting sections which have arbor holes ranging from the diameter of the motor shaft and/or the motor shaft holes in the discs of my device up to a diameter approximating twice the radial distance between the draw bolts and the center of the shaft. When said sections having enlarged arbor holes are employed in my device there is no danger of the sections being moved from rotary equilibrium because not only does the compressive force exerted by the draw bolts clamp said sections to the device, but the draw bolts pass through said sections and integrally unite them to the device.

What is claimed is:

1. In a device of the character described the combination of a rotatable shaft, a buffing wheel positioned coaxially with the shaft, a resilient clamping disc for dampening vibrations set up by operative rotation of the wheel, a fastening disc, each of said discs having a centrally disposed arbor hole formed therethrough for snugly receiving the shaft, said discs being in contact with opposed sides of the wheel, an inflexible cap disc mounted concentrically on the shaft and engaging the exposed face of the clamping disc, and draw bolts running through all of the said discs and the wheel and disposed in parallel with the shaft and spaced at equal radial distances therefrom.

2. In a device of the character described the combination of a rotatable shaft, a buffing wheel positioned coaxially with the shaft, a resilient clamping disc and a fastening disc each having a centrally disposed shaft hole formed therethrough for snugly receiving the shaft, said discs being in contact with opposed sides of the wheel, an inflexible cap disc mounted concentrically on the shaft and engaging the exposed face of the clamping disc, means for securing the wheel to said discs, an axially disposed groove formed in the clamping disc adjacent to and communicating with the shaft hole therein, a nut in the bottom of the groove, a threaded bore formed radially in the clamping disc and extending from its periphery to the groove, and a set screw threaded through the bore and the nut and bearing at its inner end against the shaft.

3. In a buffing wheel hub the combination of a resilient clamping disc, reenforcing discs in engagement with opposed sides of the clamping disc, a set screw threaded radially through the clamping disc, a nut seated against rotation in the clamping disc and threadedly receiving an intermediate portion of the screw, and means for rigidly fastening the discs and the wheel.

4. In a buffing wheel hub the combination of a wooden clamping disc, reenforcing discs in engagement with opposed sides of the clamping disc, a set screw threaded radially through the clamping disc in the direction of its grain, a nut seated against rotation in the clamping disc and threadedly receiving an intermediate portion of the screw, and means for rigidly fastening the discs to the wheel, said screw in operative position being in resilient clamping position and also locked against rotation by resilient compression of the material of the clamping disc.

5. In a buffing wheel hub the combination of a resilient clamping disc, a reenforcing disc in engagement with the clamping disc, a set screw threaded radially through the clamping disc, a nut seated against rotation in the clamping disc and threadedly receiving an intermediate portion of the screw, and means for rigidly fastening the discs and the wheel.

6. In a device of the character described the combination of a rotatable shaft, a buffing wheel positioned coaxially with the shaft, a resilient clamping disc for dampening vibrations set up by operative rotation of the wheel, a fastening disc, each of said discs having a centrally disposed arbor hole formed therethrough for snugly receiving the shaft, said discs being on opposed sides of the wheel, an inflexible cap disc mounted concentrically on the shaft and engaging the exposed face of the clamping disc, and means for fastening said discs to the wheel.

7. In a device of the character described the combination of a rotatable shaft, a buffing wheel positioned coaxially with the shaft, a resilient clamping disc for dampening vibrations set up by operative rotation of the wheel, a fastening disc, each of said discs having a centrally disposed arbor hole formed therethrough for snugly receiving the shaft, said discs being on opposed sides of the wheel, an inflexible cap disc mounted concentrically on the shaft and engaging the exposed face of the clamping disc, means for fastening said discs to the wheel, and means for locking the clamping disc to the shaft.

HARRY E. HARGY, Sr.